V. MULHOLLAND.
APPARATUS FOR TRANSFERRING GLASSWARE TO LEERS.
APPLICATION FILED OCT. 26, 1909.
1,058,193.
Patented Apr. 8, 1913.
7 SHEETS—SHEET 4.
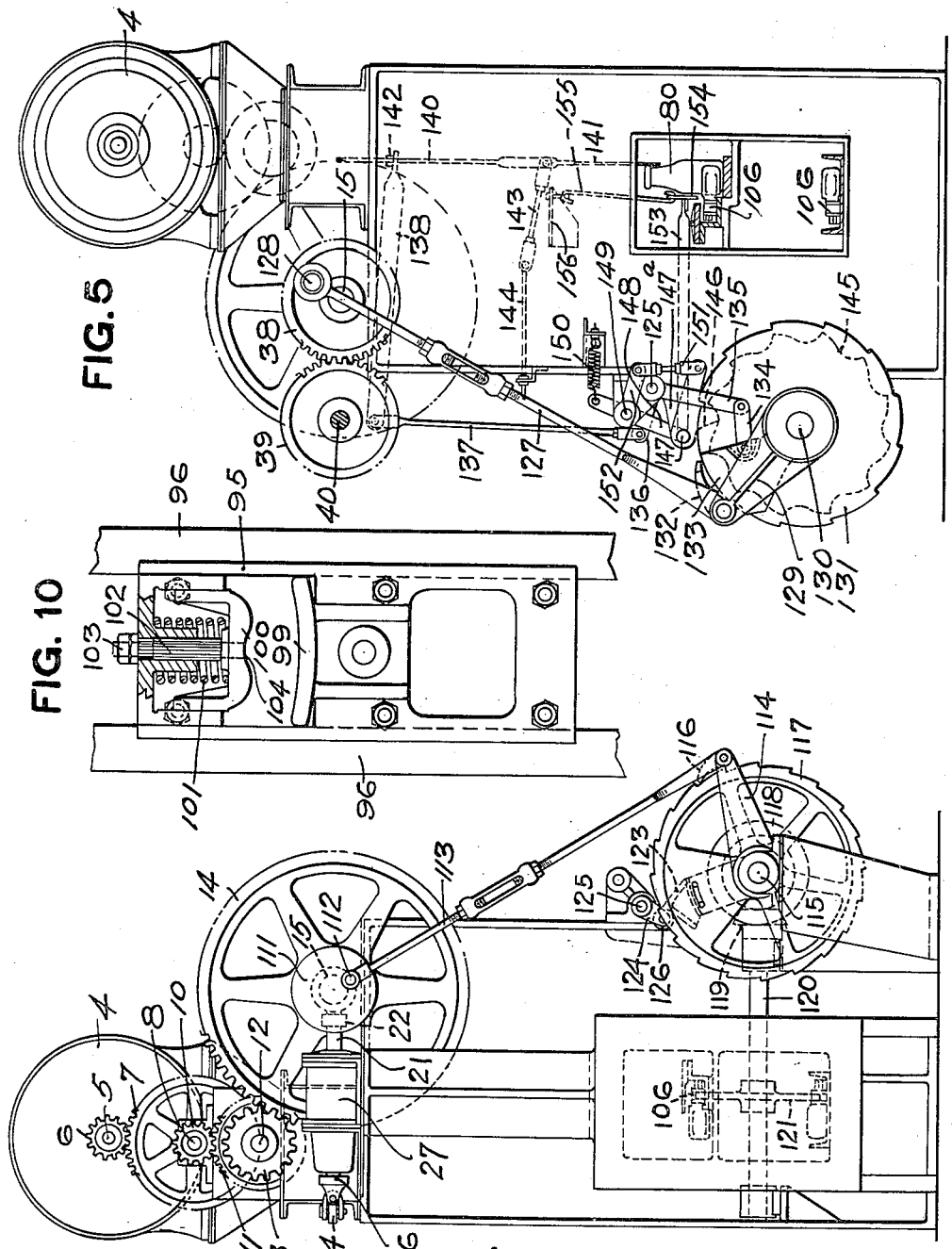

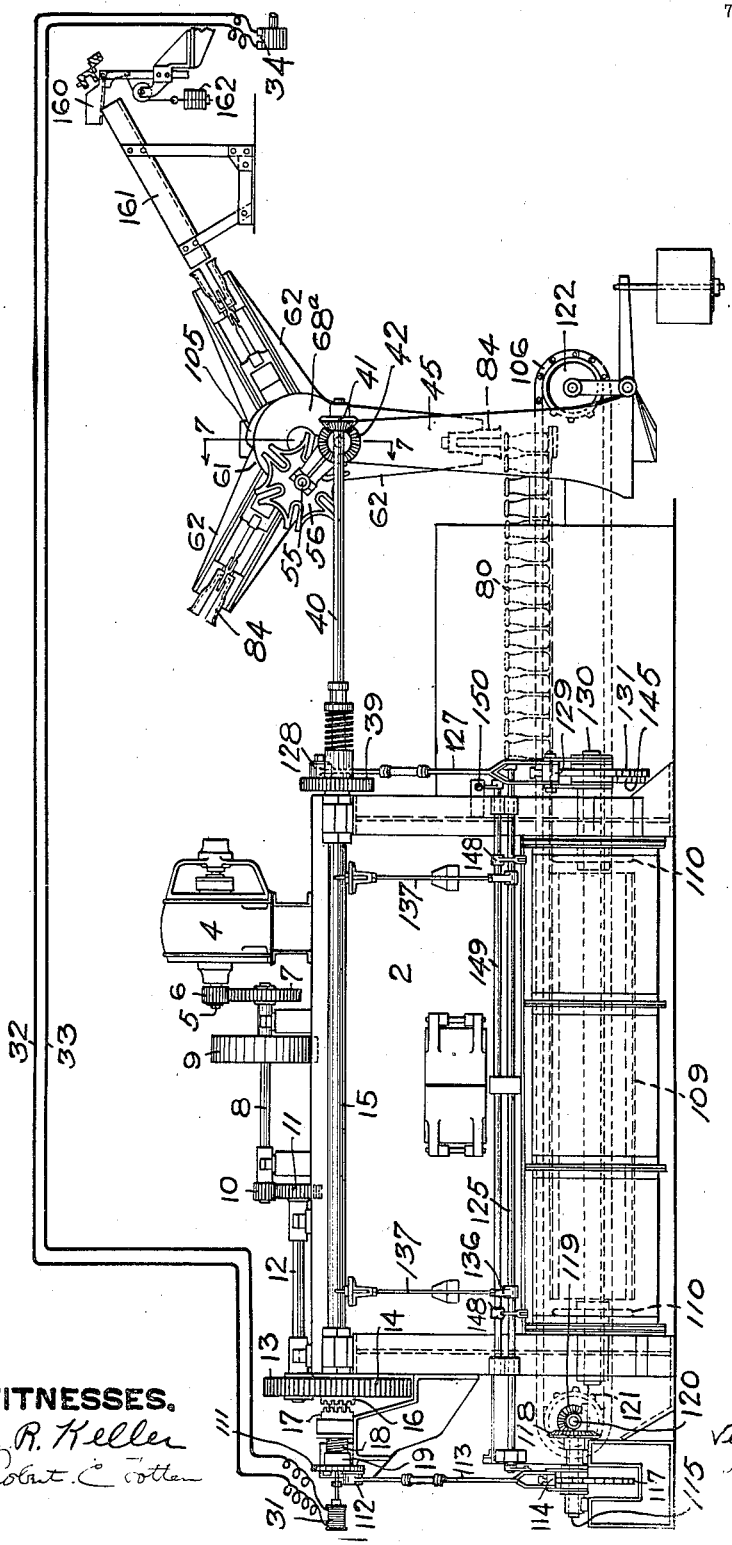

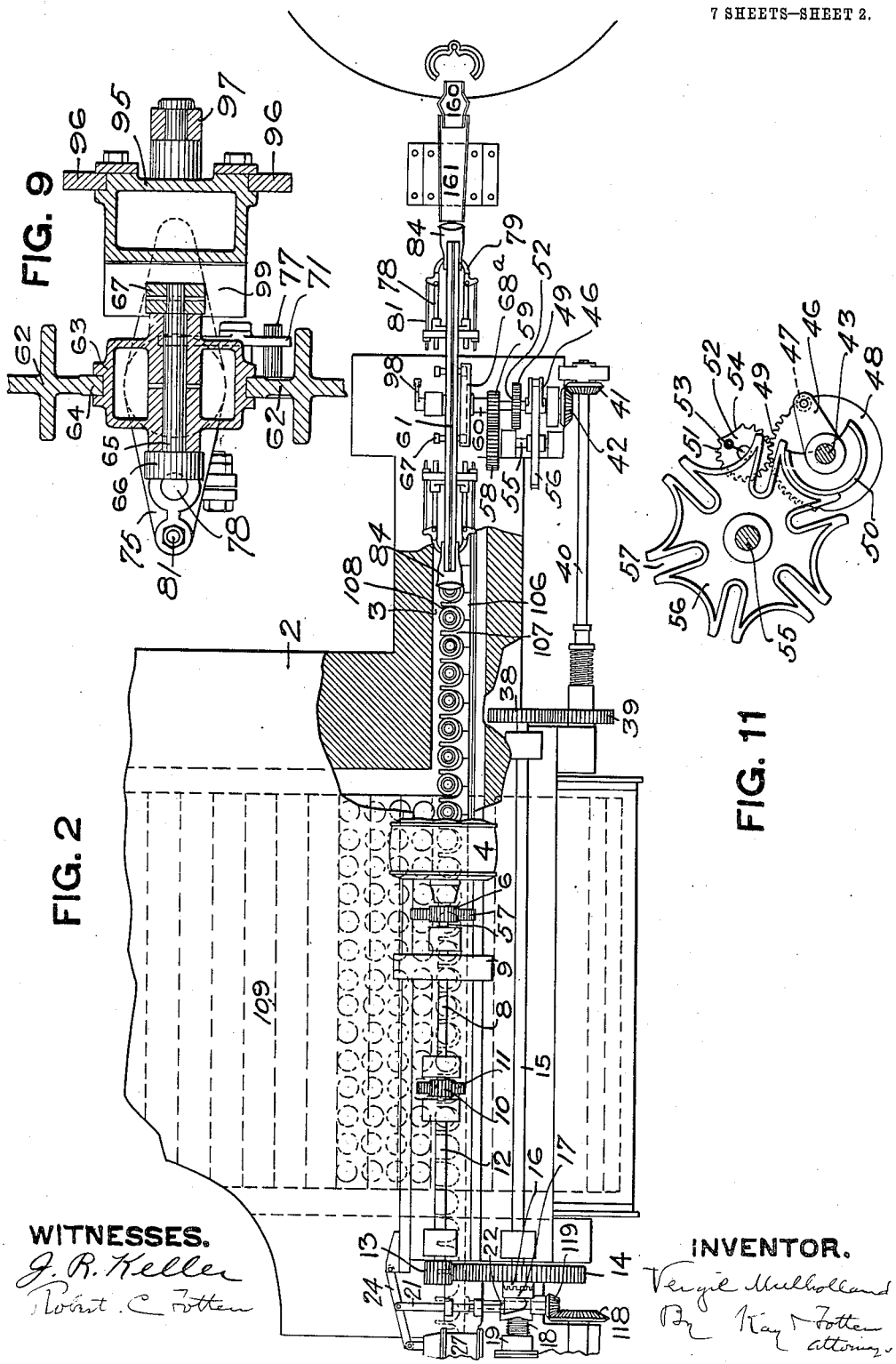

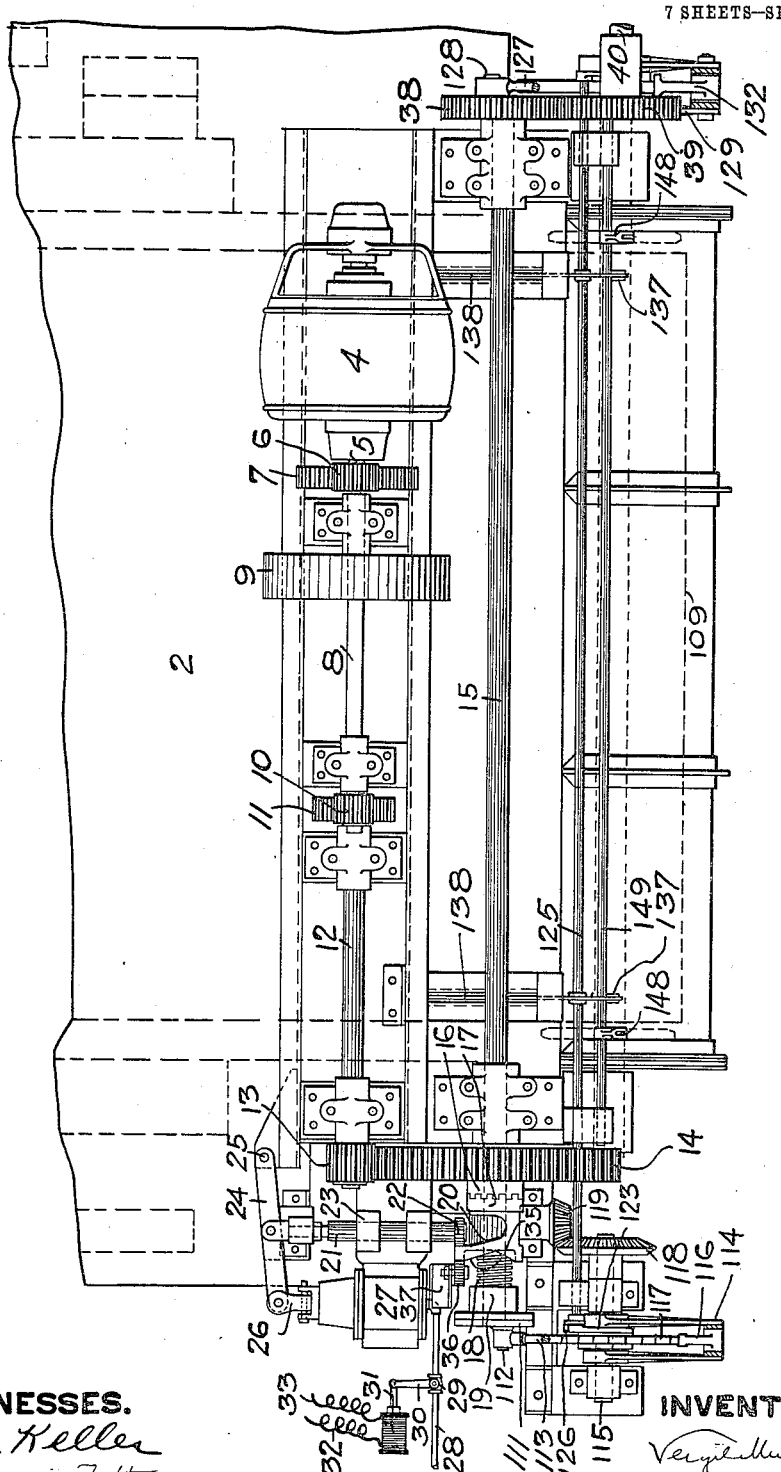

V. MULHOLLAND.
APPARATUS FOR TRANSFERRING GLASSWARE TO LEERS.
APPLICATION FILED OCT. 26, 1909.

1,058,193.

Patented Apr. 8, 1913.

7 SHEETS—SHEET 5.

WITNESSES.

INVENTOR.

V. MULHOLLAND.
APPARATUS FOR TRANSFERRING GLASSWARE TO LEERS.
APPLICATION FILED OCT. 26, 1909.

1,058,193.

Patented Apr. 8, 1913.

7 SHEETS—SHEET 6.

WITNESSES.

INVENTOR.

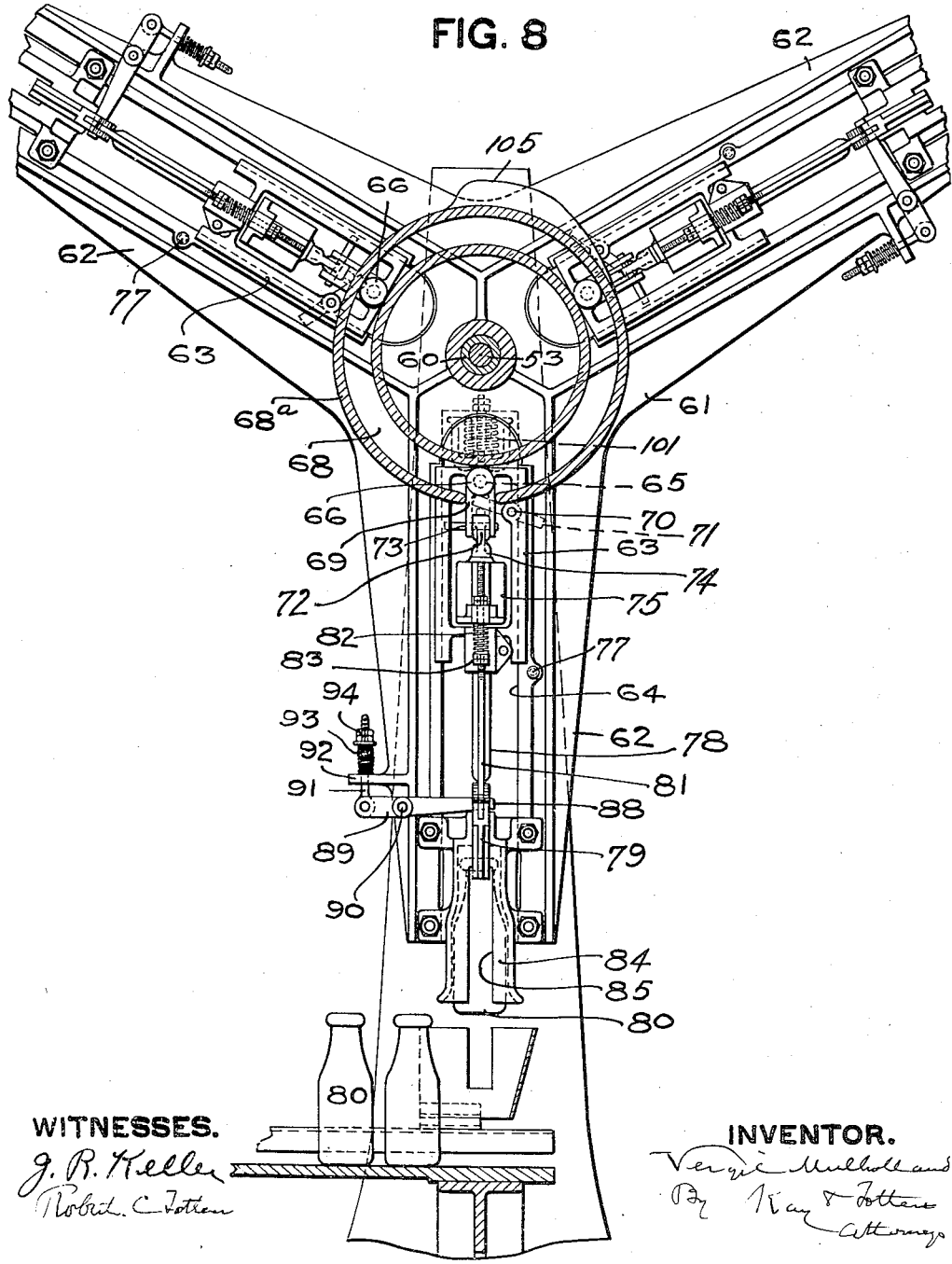

UNITED STATES PATENT OFFICE.

VERGIL MULHOLLAND, OF EDGEWOOD, PENNSYLVANIA, ASSIGNOR TO HEYL & PATTERSON INC., OF PITTSBURGH, PENNSYLVANIA, A CORPORATION OF PENNSYLVANIA.

APPARATUS FOR TRANSFERRING GLASSWARE TO LEERS.

1,058,193.   Specification of Letters Patent.   Patented Apr. 8, 1913.

Application filed October 26, 1909. Serial No. 524,730.

*To all whom it may concern:*

Be it known that I, VERGIL MULHOLLAND, a resident of Edgewood, in the county of Allegheny and State of Pennsylvania, have invented a new and useful Improvement in Apparatus for Transferring Glassware to Leers; and I do hereby declare the following to be a full, clear, and exact description thereof.

My invention relates to apparatus for handling glassware in transferring it from the mold to the leer.

The object of my invention is to provide for the rapid and careful handling of the glassware in transferring it from the mold to the leer without the employment of manual labor, and the invention comprises the novel features hereinafter set forth in claims.

Figure 6:
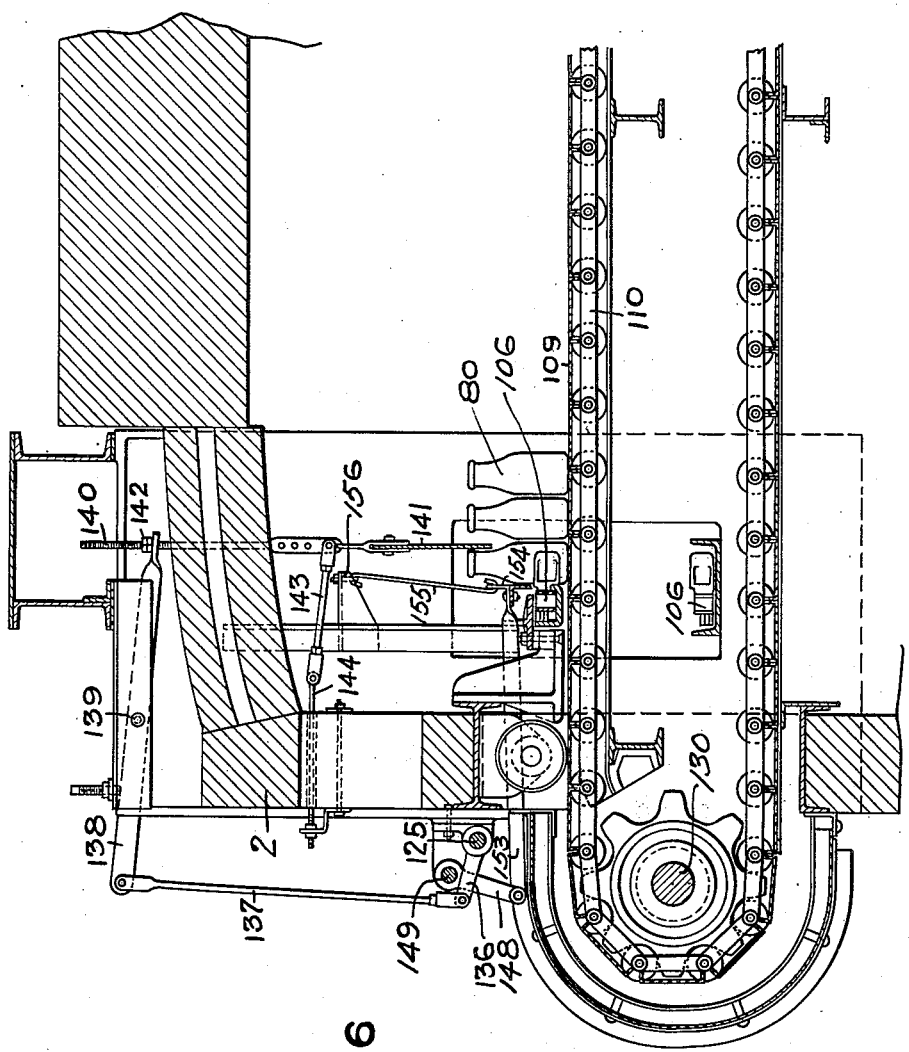
Figure 7:
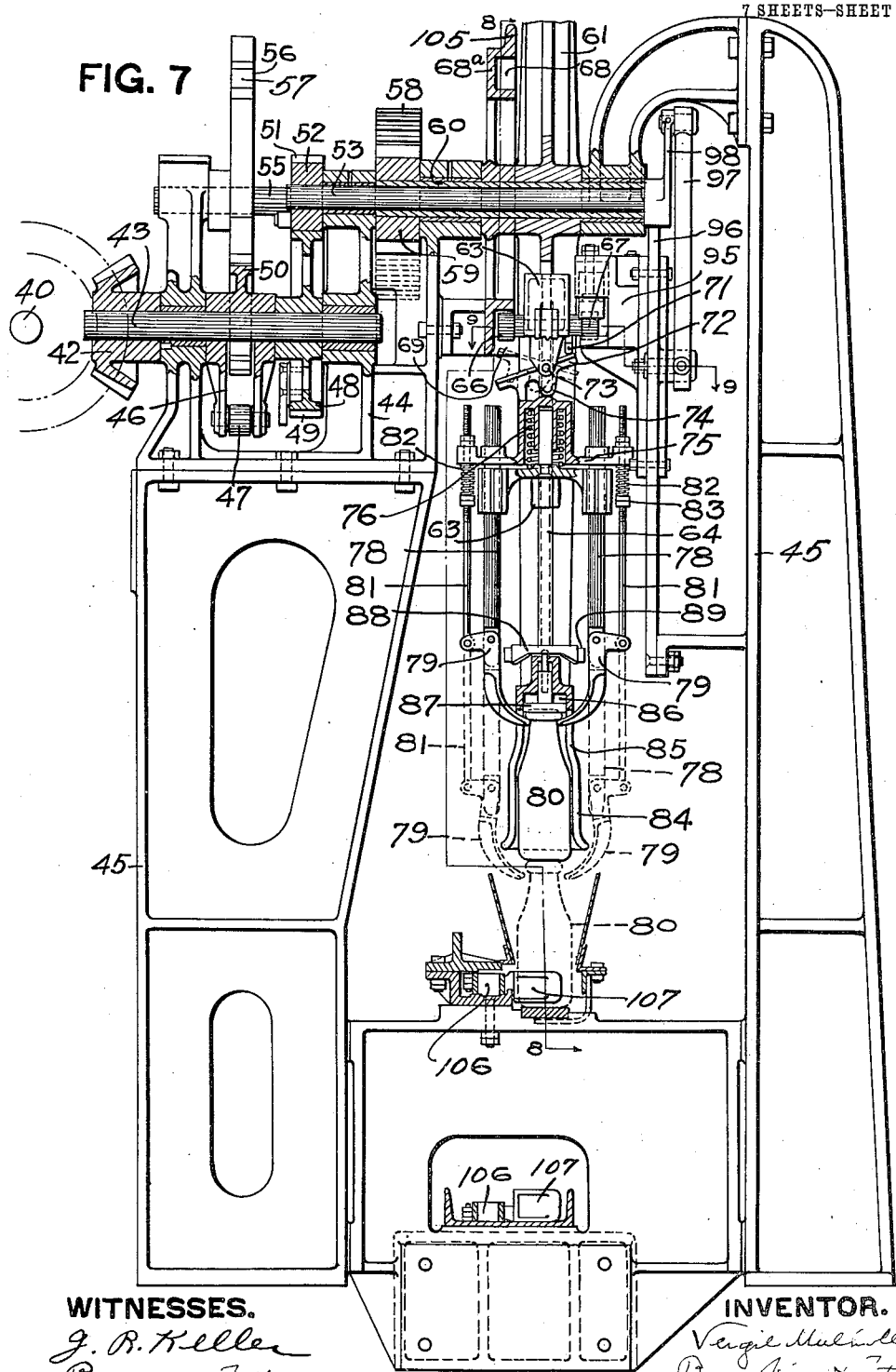

In the drawings Figure 1 is an end elevation of my improved apparatus; Fig. 2 is a plan view partly in section; Fig. 3 is an enlarged plan view of the operating mechanism; Fig. 4 is a side elevation; Fig. 5 is a side elevation, the opposite side from Fig. 4; Fig. 6 is a sectional elevation of one end of the leer showing the manner of supporting the glassware as the leer pans are fed forward; Fig. 7 is an enlarged section on the line (7—7) Fig. 1; Fig. 8 is a section on the line (8—8) Fig. 7; Fig. 9 is a section on the line (9—9) Fig. 7; and Figs. 10 and 11 are details.

In the drawings the numeral 2 designates a suitable leer provided with the entrance 3 through which the ware is introduced to the leer. Supported on the leer 2 is a suitable motor 4 with the shaft 5 carrying the pinion 6 meshing with the gear 7 on the shaft 8. A fly wheel 9 is mounted on the shaft 8. The pinion 10 on the shaft 8 meshes with the gear 11 on the shaft 12. A pinion 13 on the shaft 12 meshes with the gear wheel 14 on the shaft 15. A clutch face 16 on the gear 14 is adapted to be engaged by the clutch 17. A spring 18 is adapted to operate the clutch 17, said spring being interposed between the collar 19 and said clutch. The clutch 17 has the cam groove 20. A pin 21 has the roller 22 which engages the cam groove 20 of the clutch. This pin 21 moves in guides 23, and the outer end of said pin is connected with the lever 24 pivoted at 25 to the frame and at its other end pivoted to the piston 26 of the cylinder 27. The pipe 28 delivers the motive fluid to the cylinder 27 and said pipe is provided with valve 29, which is operated with the arm 30 connected up to the solenoid 31. The wires 32 and 33 are connected up to the solenoid and said wires lead from the contacts 34, and the circuit is made and broken intermittently for the purpose hereinafter set forth. The clutch 17 has the cam way 35 which engages the roller 36 supported by the bracket 37. The cam-way 35 is to give clearance for the roller 36 when the clutch is thrown out by the roller 22. The roller 22 engaging in the above manner acts to lock the clutch against rotary movement when released. The roller 36 acts to hold the clutch 17 in opposite engagement with the clutch face 16.

At one end of the shaft 15 is the gear wheel 38 which meshes with the gear wheel 39 on the shaft 40. A bevel pinion 41 on the shaft 40 meshes with the bevel pinion 42 on the stub shaft 43, said stub shaft being supported in suitable bearing in the housing 44 on the frame 45. The stub shaft 43 carries the arm 46 with the idle roller 47. The shaft 43 also carries the wheel 48 which has the teeth 49 formed on a portion of its periphery. The wheel 48 carries the locking segment 50 for the purpose hereinafter set forth. The teeth 49 of the wheel are adapted to mesh with the teeth 51 in the wheel 52 on the shaft 53. This wheel 52 has teeth formed only on portion of its periphery and has the smooth face 54 which is adapted to engage the untoothed portion of the wheel 48. A shaft 55 is mounted in the housings 44, and said shaft has secured thereto the star wheel 56 provided with the grooves 57 which are adapted to receive the idle roller 47, as fully hereinafter set forth. The shaft 55 carries the gear wheel 58 which meshes with the gear wheel 59 on the sleeve 60 loosely surrounding the shaft 53.

Secured to the sleeve 60 is the ware transferring device 61 which has the arms 62 which may be of any suitable number. Each one of the arms 62 carries a ware supporting device for grasping or holding the ware, depositing the same on the carrier leading to the leer. The construction of this mechanism is as follows: A sliding frame 63 engages the webs 64 of the arms 62 and said cross-head has the pin 65 extending through same, said pin carrying at its outer ends the rollers 66 and 67. The roller 66 is adapted to engage the annular groove 68 in the ring 68ª bolted to the housings 44 and surrounding the sleeve 60. This groove 68 is provided with the opening 69. Pivoted to the cross-head 63 at 70 is the arm 71. This arm 71 engages at the inner end the tilting dog 72 which is pivoted at 73 to the frame 63. This dog 72 has the projection 74 which is adapted to engage the upper end of the cross-head 75. The spring 76 is interposed between the lower end of the cross-head and the frame 63, said spring acting to throw said frame upwardly when the dog 72 is released. A stud 77 in the path of the arm 71 acts to operate said arm to trip or release the dog 72. Supported from the frame 63 are the rods 78, said rods acting as guides for the vertically movable frame 75. Pivoted to the rods 78 are the jaws 79 which are adapted to engage the neck to the bottle 80. The rods 81 carried by the frame 75 are secured to the jaws 79, springs 82 are interposed between nuts 83 on said rod to the frame 75.

Supported by the arm 62 is the bottle holder 84, said holder conforming substantially to the bottle and having the slots 85 formed therein to allow for the movement of the jaws 79, when the cross-head is lowered to deliver the bottle on to the conveyer. The bottle holder 84 has the chamber 86 at the inner end thereof and the piston 87 is adapted to move in said chamber. The piston 87 is connected with the bifurcated end 88 of the lever 89 pivoted to the arm 62 at 90. Connected to the outer end of the lever 89 is the bolt 91 which passes up through the bracket 92. A spring 93 is interposed between said bracket and the nut 94. In this manner I provide for the cushioning of the bottle as it is delivered to the holder, the head of the bottle striking the piston 87 and the impact of the blow will cause said piston to recede moving the lever 89, the cushioning action being furnished by the springs 93.

A vertically sliding frame 95 moves in the guides 96 on the frame 45 and said sliding frame 95 is connected up by the pitman 97 to the crank arm 98 on the shaft 53. The sliding frame 95 has the seat 99 and above the said seat is the clamping block 100. This clamping block, as shown in Fig. 10, fits up within the upper end of the sliding frame 95 and the spring 101 is interposed between said clamp and the upper end of said frame, while the bolt 102 is connected to the clamp and passes up through an opening in the frame where the lock nut 103 is secured to said bolt. The clamp 100 has the depression or seat 104 to receive the roller 67 on the pin 64, as hereinafter set forth.

Formed on the ware carrying device 61 is the cam 105 which is adapted to engage the outer end of the locking dog 72 to bring the locking jaws 79 into position for engaging the neck of the bottle.

As above stated, the leer is provided with the side opening 3 for the introduction of the ware to the leer and the conveyer 106 is provided for receiving the ware from the carrier 61, as indicated in Fig. 7. This conveyer consists of an endless chain with the flights 107 forming compartments 108 to receive the bottles. This conveyer 106 is adapted to operate intermittently, and the mechanism for operating same must be timed in connection with the carrier 61 to receive the bottle delivered from the carrier and move the bottle one space so as to bring an empty compartment into position to receive the next bottle. The bottles are moved by the conveyer 106 onto the leer pans 109, and when one of the leer pans have been filled, the conveyer chain 110 within the leer, is moved the distance of one pan so as to bring the next pan into position to receive another row of bottles. I will now describe the mechanism by which these means are accomplished.

The disk 111 is mounted on the shaft 15 and said disk is provided with wrist pin 112 to which the rod 113 is attached. The opposite end of the rod 113 is connected to the arm 114 on the shaft 115. A pawl 116 is pivoted to the outer end of the arm 114 and said pawl is adapted to engage the ratchet wheel 117 rigidly secured to the shaft 115. A bevel pinion 118 on the shaft 115 meshes with the bevel pinion 119 on the shaft 120, which carries the sprocket wheel 121 with which the chain 106 engages. The sprocket wheel 122 operates in connection with the sprocket wheel 121 to support the chain 106. A tripping arm 123 is secured to the ratchet wheel 117, and when said ratchet wheel has made a complete revolution, said trip comes in contact with the arm 124 on the shaft 125 having the vertical roller 126. At the opposite side of the leer is the pitman 127, which is connected by the wrist pin 128 to the gear wheel 38. The opposite end of the pitman 127 is connected to the arm 129 loosely mounted on the shaft 130. The ratchet wheel 131 is secured to the shaft 130 and the pawl 132 on the outer end of the arm 129 is adapted to engage the teeth of the ratchet wheel 131. To prevent pawl 132 from engaging the ratchet wheel, I employ the guard 133 which is loosely mounted on the shaft 130. This guard 133 is connected by the link 134 to the arm 135. The upper end of the arm 135 is connected to the shaft 125. A link 136 is secured to the shaft 125 and to the rod 137. The rod 137 is connected to the lever 138, fulcrumed to the frame at 139. The outer ends of the levers 138 are connected to the rods 140 which are connected to the plate 141 which extends along in front of the row of bottles on the leer pan for the purposes hereinafter set forth. The rod 140 is threaded and provided with the nut 142 for purposes of adjustment. In order to guide and steady the movement of the rods 140, I employ the arms 143 which are connected to the rods 144 in the frame.

Mounted on the shaft 130 is the toothed wheel 145. The pawl 146 engages the teeth on the wheel 145 and teeth of said wheel are so shaped that the pawl 146 is moved away from said wheel. This pawl 146 is supported on the pin 147 on the bracket 147ª on the frame. The arm 148 is fastened on the shaft 149 and the spring 150 connects the upper end of the arm 148 with the frame. The outer end of the dog 146 is connected to the rod 151, and the upper end of said rod is connected with the arm 152 which is connected to the shaft 149. The pusher arms 153 are connected with the arms 148, and it will be apparent that when the pawl is raised by the rotation of the wheel 145 rods 151 will be raised, and through the arms 152 the shaft 149 will be rocked. This rocking of the shaft 149 will move the arms 148 inwardly and the pusher rods 153 will be moved forward. The pusher rods 153 are connected to the plate 154 and said plate is suspended to the links 155 carried from the brackets 156. The combined action of the plates 141 and 154 is to support the jar or bottle against falling or displacement when the leer pan is moved forward, and said plates act in conjunction with the movement of the leer pan, as will more fully hereinafter appear.

When my improved apparatus is in use its operation is as follows: The apparatus is intended to be used in connection with a molding machine, and as the jar or other article being formed is being molded, the mold is opened and the jar is delivered by the tilting chute 160 and the chute 161 inclined at proper angle. The tilting chute 160 is connected with the weight 162 for returning of said chute to its normal position after the jar has been delivered therefrom. The chute 161 is at such an angle to correspond with the angle of the arms 62 of the transferring device, when said transferring device is at a standstill. The finished jar is delivered to the chute 161 with its neck end downward and the said jar slides by its own weight down the chute 161 into the holder 85. The head of the jar strikes the cushion 87 and said cushion yields sufficiently to relieve the jar of sufficient shock to mar or injure the head or shoulder of the jar. As soon as the jar is received in the holder in this way, the arm 46 on the shaft 43 is timed to enter one of the notches 57 of the star wheel 56, and a rotary movement is imparted to said star wheel. This rotation of the star wheel 56 will rotate the shaft 55, and through the gear wheel 58 meshing with the gear wheel 59 on the sleeve 60 a rotary movement is imparted to the transferring device 61. The rotation of the transferring device brings the outer end of the locking dog into contact with the cam 105, and said locking dog is brought to the position shown in Fig. 7 when the projection 74 on said dog engages the upper end of the frame 75 and forces said frame down on the rods 78 to the position indicated in full lines in Fig. 7, whereupon the rods 81 are lowered and the jaws 79 guided by the rods 78 are moved inwardly to grasp bottle around the neck. The frame 61 continues to rotate with the rollers 66 on the pin 65 moving in the annular groove 68 until the roller 66 comes into register with the opening 69. Just as soon as this takes place, the shaft is rotated by the engagement of the toothed wheel 48 with the toothed wheel 52. This rotation of the shaft 53 will operate the pitman 97 and the vertically moving frame 95 will be lowered by said pitman. At the same time that the roller 66 has come into register with the opening 69, the roller 67 on the opposite end of the pin 64 moves on to the support 99 of said frame, and the movable block 100 is raised sufficiently to permit the roller 67 to enter the depression 104, whereupon by the action of the spring 101 the roller is locked or held in this position on the vertically moving frame 95. The frame 95 is now lowered by the pitman 97 and the pin and rollers of the cross head 63 are carried through the opening 69 and the cross head is lowered in this manner until the arm 71 on the cross head strikes the pin 77. The engagement of the arm 71 by the pin 77 acts to trip the dog 72 and the frame 75 is moved up by the spring 76. This takes place when the bottle has been lowered to the position indicated in the dotted lines Fig. 7, where it is resting upon the conveyer 106. The upward movement of the frame 75 through the rods 81 opens the jaws 79 and the bottle is released and rests in one of the compartments of the conveyer 106. Before another bottle is delivered to the conveyer 106 it is necessary to move the conveyer the distance of one compartment. Movement of the conveyer is timed to take place just as soon as the bottle is delivered to one of its compartments. This intermittent movement of the conveyer 106 is accomplished in the following manner: The circuit to the solenoid 31 is completed at this stage of the operation and the clutch 17 through the mechanism hereinbefore described, is thrown into engagement with the clutch 16 of the gear wheel 14. This imparts a rotary motion to the disk 111 and the pitman 113 is moved together with the arm 114, the pawl 116 moving over the teeth of the ratchet wheel 117. The number of the teeth on the ratchet wheel 117 corresponds to the number of bottles to be placed on each leer pan, and accordingly the ratchet wheel 117 is advanced the proper amount to give the necessary rotary movement to the shaft 120, operate the sprocket wheel 121 to move the chain 106 the required distance and bring an empty compartment in position to receive the next bottle from the transferring device 61. The movement of the chain 106 is stopped by the throwing out of the clutch 17, and this is accomplished by the action of the cam groove 20 on the roller 22 of the pin 21. As the clutch rotates, the cam groove rotating in contact with the wheel 22 will draw the clutch from engagement with the clutch face 16, and the movement of the disk 111 is stopped. When the leer pan has been filled it is necessary to move the leer pan forward to bring an empty leer pan in position to receive the next row or ware, and this is done in the following manner: When the ratchet wheel 117 has made a complete revolution the trip 123 will come in contact with the arm 124 and said arm will be raised to rock the shaft 125. This rocking of 125 will act through the arms 135 and link 134 to move the guard 129 on the ratchet wheel 131. This movement of the guard 129 will permit the pawl 132 to engage the teeth of the ratchet wheel 131, and through the pitman 127 operated from the gear wheel 38 the ratchet wheel 131 will be rotated, and this rotation of the ratchet wheel 131 will operate the shaft 130 and so operate the chain 129 to move the said chain the distance of one leer pan to bring an empty leer pan into position to receive the next row of bottles. In order to protect the bottles against any jarring action due to this action of the leer pan, and prevent the bottles from being thrown over or displaced, I provide the plates 141 and 154. The plates 141 act as a guide when the bottles are being arranged on the leer pan, and when the leer is moved forward it is necessary to raise the plate 141 out of the way. This is timed to take place just as a leer pan moves forward. As the shaft 125 is rocked in the manner above set forth the arms 137 are lowered which operates the levers 138 and raises the plate 141. The plates 154 support the bottles from the rear, and these plates are moved forward simultaneously with the leer pan, and this movement is obtained by the rotary movement of the grooved wheel 145, whose movement will raise the pawl 146 and rods 151. This forward movement of the rods 151 will act to rock the shaft 149 and rocking of said shaft will move the arms 148 inwardly and with them the pusher bars 153. In this manner the plates 154 are advanced simultaneously with the movement of the leer pan.

What I claim is:

1. In apparatus for handling glassware, combination of an intermittent rotary frame, having radially extending arms, a frame movable back and forth on said arms, and ware grasping jaws on said frame, mechanism for opening and closing said jaws, a conveyer, means for lowering said movable frame in position to deposit the ware on said conveyer.

2. In apparatus for handling glassware, combination of an intermittent rotary frame, having radially extending arms, a frame movable back and forth on said arms, ware grasping jaws on said frame, a cross-head movable on said frame, connections between said cross-head and said jaws, a conveyer, means for lowering said movable frame in position to deposit the ware on said conveyer, and means for operating said cross-head to open said jaws to release said ware.

3. In apparatus for handling glassware, combination of an intermittent rotary frame, having radially extending arms, a frame movable back and forth on said arms, mechanism for operating said last named frame, ware grasping jaws carried by said movable frame, a spring actuated cross head movable on said movable frame, connections between said cross head and said jaws for opening and closing the same, a locking member on said movable frame engaging said cross-head, means for releasing said locking member, a conveyer, means for lowering the ware onto said conveyer, and means for releasing said locking member to deposit said ware thereon.

4. In apparatus for handling glassware, combination of a rotary frame, having radially extending arms, a frame on said arms movable back and forth, mechanism for moving said frame, ware grasping jaws carried by said last named frame, a spring controlled cross-head movable on said last named frame, a locking dog on said movable frame adapted to engage said cross-head, connections between said cross-head and said jaws, a tripping lever engaging said dog, means in the path of said tripping lever for operating the same, a conveyer, and means for depositing the ware on said conveyer.

5. In apparatus for handling glassware, combination of a rotary frame having radially extending arms, a frame movable back and forth on said arms, ware grasping jaws carried by said movable frame, a spring controlled cross-head movable on said last named frame, connections between said cross-head and said jaws, and locking dog carried by said movable frame and engaging said cross-head, a tripping lever engaging said dog, means in the path of said lever for operating same, a cam in the path of said dog to restore the same to locking position, a conveyer, and means for depositing the ware on said conveyer.

6. In apparatus for handling glassware, combination of a rotary frame, having radially extending arms, a frame movable back and forth on said arms, ware grasping jaws carried with said movable frame, a spring controlled cross-head movable on said last named frame, connections between said cross-head and said jaws, a locking dog on said last named frame engaging said cross-head, means for operating said locking dog, an intermittently operating vertically movable frame adapted to engage said movable frame to raise and lower same, and a conveyer adapted to receive the ware lowered thereto by said vertically movable frame.

7. In apparatus for handling glassware, combination of a rotary frame, having radially extending arms, a frame movable back and forth on said arms, an annular guide-way with which said movable frame engages, said guide-way having an opening therein, ware grasping jaws on said movable frame, means for operating said jaws, a vertically movable frame, mechanism for operating said vertically movable frame intermittently, means for bringing said movable frame on said arms into engagement with said vertically movable frame, whereby said movable frame is raised and lowered through the opening in said annular guide way, and a conveyer in position to receive the ware carried by said jaws.

8. In apparatus for handling glassware, combination of a rotary frame, having radially extending arms, a frame movable back and forth on said arms, an annular guide way having an opening therein, a roller on said movable frame engaging said guide way, a vertically movable frame, means for operating said last named frame up and down, a second roller on said movable frame adapted to engage said vertically movable frame when the first named roller is opposite the opening in said annular guideway, ware grasping jaws carried by said movable frame, means for opening and closing said jaws, and a conveyer in position to receive the ware from said jaws.

9. In apparatus for handling glassware, combination of a rotary frame, having radially extending arms, a frame movable back and forth on said arms, a roller on said last named frame engaging an annular guide way having an opening therein, a vertically movable frame, mechanism for operating said last named frame intermittently, a second roller on said movable frame, a seat on said vertically movable frame with which second named roller is adapted to engage, a yielding block engaging said roller from above, ware grasping jaws carried by said movable frame, means for opening and closing said jaws, and a conveyer in position to receive the ware from said jaws.

10. In apparatus for handling glassware, the combination of a rotary frame, having radially extending arms, ware grasping mechanism on said arms, and means for cushioning the ware carried by said arms, whereby the jar on said ware when delivered to said arms is relieved.

11. In apparatus for handling glassware, combination of a rotary frame, having radially extending arms, ware grasping mechanism on said arms, and a cushioning piston carried by said arms, whereby the jar on said ware when delivered to said arms is relieved.

12. In apparatus for handling glassware, combination of a rotary frame, having radially extending arms, ware grasping mechanism on said arms, and a spring actuated cushioning piston carried by said arms, whereby the jar on said ware when delivered to said arms is relieved.

In testimony whereof, I the said VERGIL MULHOLLAND have hereunto set my hand.

VERGIL MULHOLLAND.

Witnesses:
 ROBERT C. TOTTEN,
 J. F. WILL.